United States Patent [19]
Påhlsson

[11] Patent Number: 5,974,692
[45] Date of Patent: Nov. 2, 1999

[54] APPARATUS FOR AIR-TREATMENT OF PRODUCTS

[75] Inventor: Sten Påhlsson, Ödåkra, Sweden

[73] Assignee: Frigoscandia Equipment AB, Helsingborg, Sweden

[21] Appl. No.: 09/073,247

[22] Filed: May 6, 1998

[51] Int. Cl.[6] ................................................ F26B 17/00
[52] U.S. Cl. ............................................ 34/583; 34/147
[58] Field of Search .............................. 34/580, 582, 583, 34/64, 135, 136, 147, 166, 180, 203, 210, 211, 216; 426/461, 496; 99/443, 476, 477, 478, 479, 483; 62/266, 378, 381; 198/570, 778

[56] References Cited

U.S. PATENT DOCUMENTS

| | | | |
|---|---|---|---|
| 3,938,651 | 2/1976 | Alfred et al. | 34/147 X |
| 4,480,535 | 11/1984 | Jaxmar et al. | 34/147 X |
| 4,565,282 | 1/1986 | Olsson et al. | |
| 4,875,343 | 10/1989 | Jeppsson . | |
| 4,941,567 | 7/1990 | Olsson . | |
| 5,031,751 | 7/1991 | Pahlsson . | |
| 5,226,295 | 7/1993 | Jaxmar . | |
| 5,335,590 | 8/1994 | Crump, III et al. | 99/479 |
| 5,346,057 | 9/1994 | Fisher et al. | 198/778 |
| 5,515,775 | 5/1996 | Crump, III et al. | 99/479 |

*Primary Examiner*—Henry Bennett
*Assistant Examiner*—Steve Gravini
*Attorney, Agent, or Firm*—Browdy and Neimark

[57] ABSTRACT

An apparatus for air-treatment of products comprises an endless conveyor belt following through part of its length a helical path forming a stack of tiers. Side plates at one longitudinal edge of the conveyor belt form an outer cylinder wall delimiting the stack radially outwards. An inner cylinder wall delimits the stack radially inwards. Thereby, a central space is defined by the inner cylinder wall and an annular space is defined between the outer cylinder wall and the inner cylinder wall. An end closure substantially adjoins the outer cylinder wall at one end of the stack. Means are provided for blowing air through the central space towards the end closure and back through the annular space between the outer and inner cylinder walls for air-treatment of products carried by the conveyor belt in the helical path. The air is conditioned and blown through the annular space between the outer and inner cylinder walls.

14 Claims, 3 Drawing Sheets

APPARATUS FOR AIR-TREATMENT OF PRODUCTS

BACKGROUND OF THE INVENTION

The present invention relates to air-treatment of products, primarily food products and the like, using appropriately conditioned air.

The prior art includes several types of apparatuses for such treatment where the conditioned air is substantially different from the air surrounding the apparatus. Therefore, it is important that the conditioned air is recirculated within the apparatus, i.e. the apparatus should be as air-tight as possible and this often makes the apparatus complex and expensive.

When the difference between the conditioned air and the surrounding air is not very extreme, a less complicated apparatus would be preferable.

SUMMARY OF THE INVENTION

The object of the present invention is to provide a simple and cost-effective apparatus for air-treatment of products, such as cooling and proofing.

This object is achieved with an apparatus which comprises an endless conveyor belt following through part of its length a helical path forming a stack of tiers; side plates at one longitudinal edge of the conveyor belt forming an outer cylinder wall delimiting the stack radially outwards; means forming an inner cylinder wall delimiting the stack radially inwards, whereby a central space is defined by the inner cylinder wall and an annular space is defined between the outer cylinder wall and the inner cylinder wall; an end closure substantially adjoining the outer cylinder wall at one end of the stack; means for blowing air through the central space towards the end closure and back through the annular space between the outer and inner cylinder walls for air-treatment of products carried by the conveyor belt in the helical path; and means for conditioning the air to be blown through said space between the outer and inner cylinder walls.

By this design, the outer cylinder wall also forms the single peripheral wall of the apparatus which therefore does not need any separate housing. This means a major cost reduction, The fact that the outer cylinder wall may not form a perfect air-tight wall is of less importance when the influence of the conditioning means on the air, e.g. for heating or cooling the air or for adjusting its humidity, is not very substantial.

In a first embodiment of the apparatus according to the invention, the end of the central space opposite to the end closure is closed except for an inlet to the air-blowing means. Thus, air is sucked into the apparatus from the environment by the air-blowing means and is returned to the environment, preferably at an open end of the annular space opposite to the end closure, after having passed first through the conditioning means and then through the annular space where the products to be treated are carried by the conveyor belt along the helical path. In this embodiment, the conditioning means is positioned in the central space within the inner cylinder wall.

Alternatively, the conditioning means may be positioned outside a room accommodating the apparatus, wherein the room has an inlet from the conditioning means and an outlet.

In a further embodiment, the apparatus comprises a further end closure substantially adjoining the outer cylinder wall at the other end of the stack, whereby air is blown in a substantially closed path. In this embodiment, the conditioning means may be positioned in the inner space within the inner cylinder wall or may be positioned in the further end closure.

DESCRIPTION OF THE PREFERRED EMBODIMENTS

Figure 1:
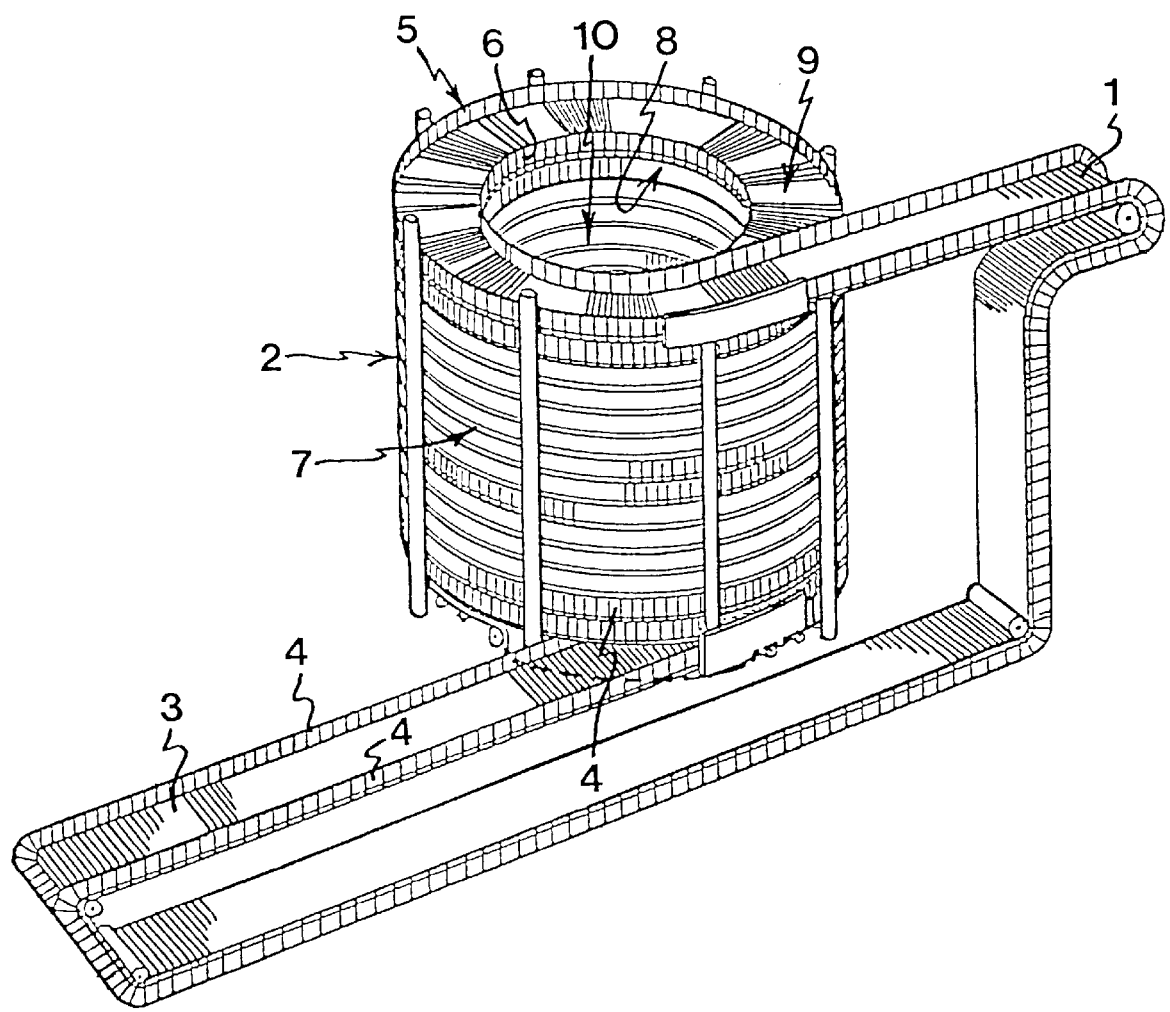
FIG. 1 is a schematic perspective view illustrating a belt conveyor of the prior art.

A belt conveyor of the type shown in FIG. 1 has a conveyor belt 1 adapted to follow, in the manner illustrated, through part of its length a path comprising a number of superimposed helically extending tiers forming a stack 2. The illustrated conveyor belt 1 comprises a number of mutually articulated links and can run straight and in curves upwards, downwards and sideways.

Each link comprises a bottom part 3 and a spacer 4 at least at the outer longitudinal side 5 of the conveyor belt 1, as seen in the stack 2. Each link may have a spacer 4 also at the inner longitudinal side 6 of the conveyor belt 1. The spacers 4 of an underlying tier in the stack 2 engage and support the corresponding side edge of an overlying tier. Thereby, the spacers 4 at the outer longitudinal side of the conveyor belt 1 in the stack 2 form an outer cylinder wall 7, and the spacers 4 at the inner longitudinal side of the conveyor belt 1 in the stack 2 form an inner cylinder wall 8, such that an annular space 9 is formed between the outer cylinder wall 7 and the inner cylinder wall 8. A cylindrical central space 10 is formed within the inner cylinder wall 8.

As an alternative to the inner cylinder wall 8 formed by spacers 4, the inner cylinder wall may comprise a wall separate from the conveyor belt: 1, e.g. a wall formed on the outer periphery of a drum used for supporting the conveyor belt at its inner longitudinal side in the stack.

In both alternatives, the annular space 9 is used as a channel for blowing air past products carried by the conveyor belt 1. Normally, the air is blown vertically through the annular space 9 to cool or heat the products or to change the moisture content of the products.

The alternative types of conveyor belts referred to above are described more in detail in U.S. Pat. Nos. 3,938,651; 4,565,282; 4,875,342; 4,941,567; 5,031,751; and 5,226,291, which all are incorporated herein by reference. Further, these conveyor belts may be combined with several types of supporting and/or driving means found in the prior art. Some of these supporting and/or driving means also are described in the above referenced patents.

The above described conveyor belts may be used in an apparatus for air-treatment of products according to the present invention, as illustrated in FIGS. 2–5. In these Figures, the conveyor belt 1 is illustrated very schematically as a stack 2 of tiers and those parts of the conveyor belt 1 which are outside the stack 2 are not shown, Further, the conveyor belt used has preferably spacers 4 at both longitudinal sides such that the stack 2 is self-supported except for the lowest tier.

Figure 2:
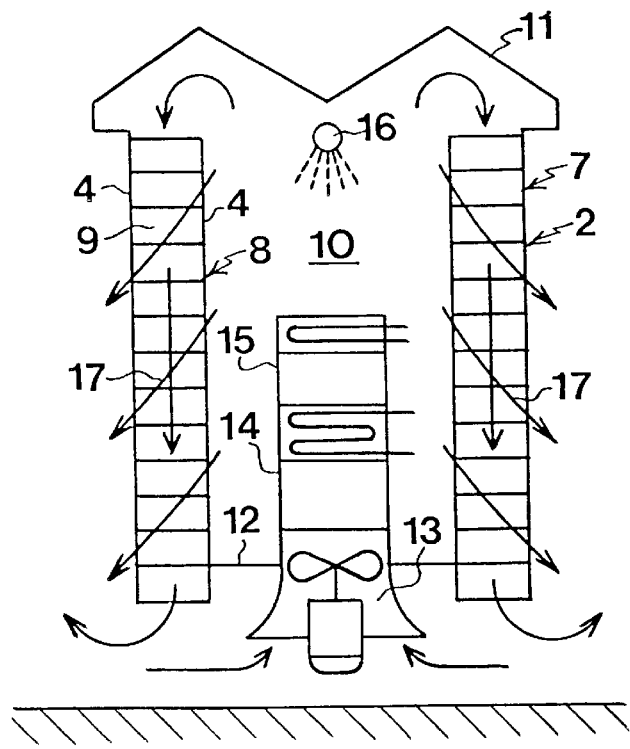
FIG. 2–5 are schematic side views of four embodiments of an apparatus for air-treatment of products according to the present invention.

The embodiment illustrated in FIG. 2 comprises the stack 2 and a top cover 11 which constitutes an end closure substantially adjoining the outer cylinder wall 7 at the top end of the stack 2. Further, a horizontal partition 12 is positioned near the bottom of the central space 10 adjoining to the inner cylinder wall 8. This partition 12 closes the central space 10 at its lower end except for an inlet to a fan 13 which constitutes a means for blowing air from outside the stack 2 upwards through the central space 10 against the top cover 11 where the flow of air is redirected down through the annular space 9 from the top end to the bottom end thereof. The annular space 9 is open at its bottom end so that the air blown through the annular space 9 can escape at that end. As shown in FIG. 2, the air sucked in by the fan 13 is passed through a cooler 14 and/or a heater 15 and/or is passed by a steam generator 16 so as to condition the air before its passing down through the annular space 9.

The above described configuration is useful when the required air velocity is not too high, e.g. less than about 2 m/s, and also when the conditioning of the air to be blown through the annular space 9 is not very substantial, e.g. the required temperature decrease/increase generated by the cooler 14/heater 15 and/or the humidity increase obtained through the steam generator 16. As illustrated by arrows 17 directed from the inside of the inner cylinder wall 8 through the stack 2 to the outside of the outer cylinder wall 7 neither one of these walls 7 and 8 need to be perfectly tight. Thus, it is possible to use a conveyor belt of the types described above being self-supported at least at its outer edge in the stack 2 and, preferably, being self-supported also at its inner peripheral edge in the stack 2.

The arrangement supporting the conveyor belt 1 and the top closure 11 in FIG.1 is not illustrated but are obvious to the man skilled in the art. However, it should be noted that the stack 2 formed by the conveyor belt 1 is continuously revolving while the top closure 11 is stationary.

Figure 3:
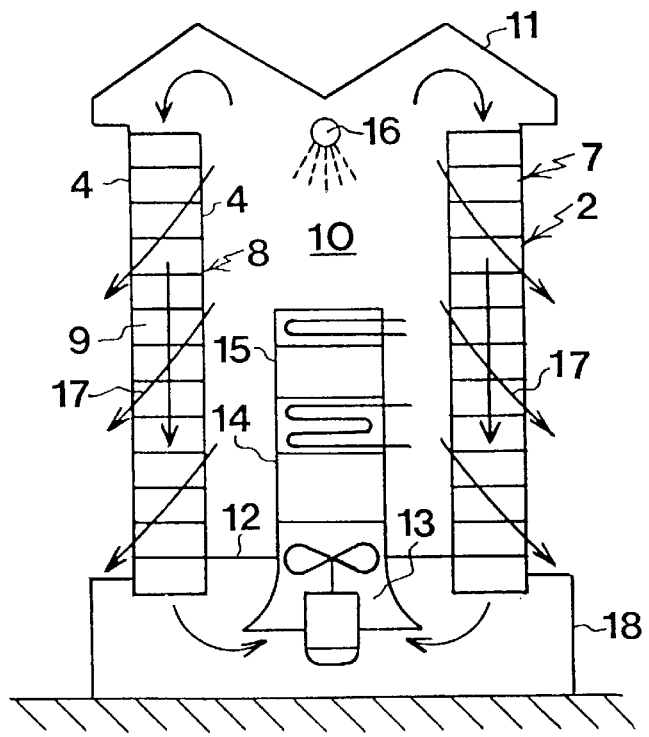

The embodiment illustrated in FIG. 3 differs from the one illustrated in FIG. 2 in that a skirt 18 surrounds the lower end of the apparatus and forms a closure adjoining the bottom end of the outer cylinder wall 7 and the floor beneath the apparatus. Thereby, the air blown up through the central space 10, down, through the annular space 9 and out of the bottom open end of the annular space 9 is recirculated by being sucked into the fan 13. Of course, this skirt 18 is much simpler and cheaper than the housing normally used in the prior art apparatus, as exemtplified in the references cited above.

Figure 4:
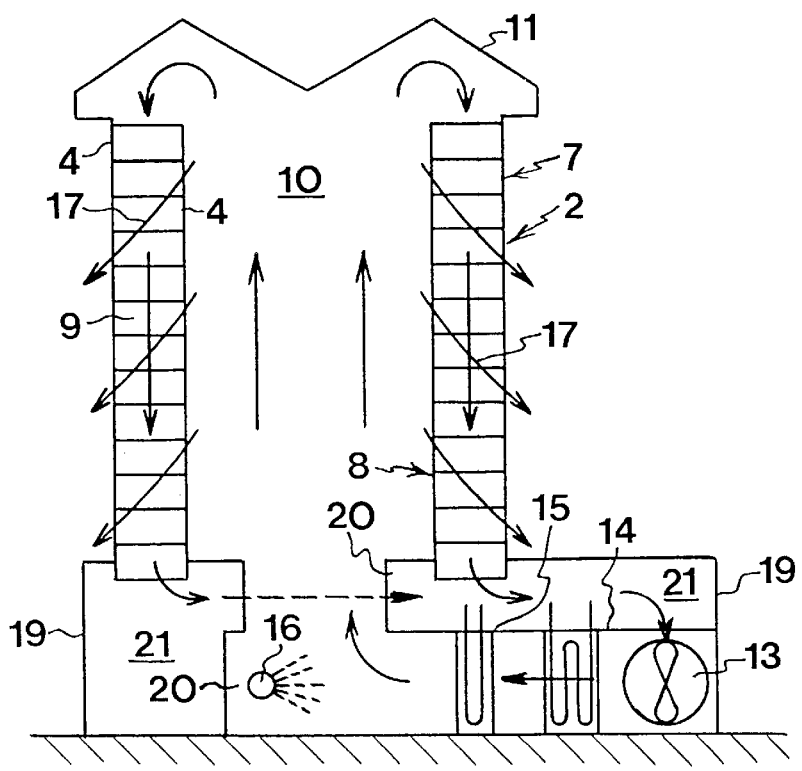

The embodiment illustrated in FIG. 4 uses double skirts, i.e. a first skirt 19 corresponding to the skirt 18 in the embodiment illustrated in FIG. 3 and a second skirt 20 adjoining the bottom end of the inner cylinder wall 8 and the floor beneath the apparatus. As a result, a chamber 21 is formed below the stack 2. This chamber 21 has a first opening that coincides with the bottom opening of the annular space 9 and a second opening towards the central space 10 within the inner cylinder wall 8. More precisely, the fan 13 and the conditioning means comprising a cooler 14 and/or a heater 15 and/or a steam generator 16, are inserted between the second opening and the lower end of the central space 10. As a consequence of the opening in the chamber towards the conditioning means, no partition is necessary at the lower end of the central space 9.

Figure 5:
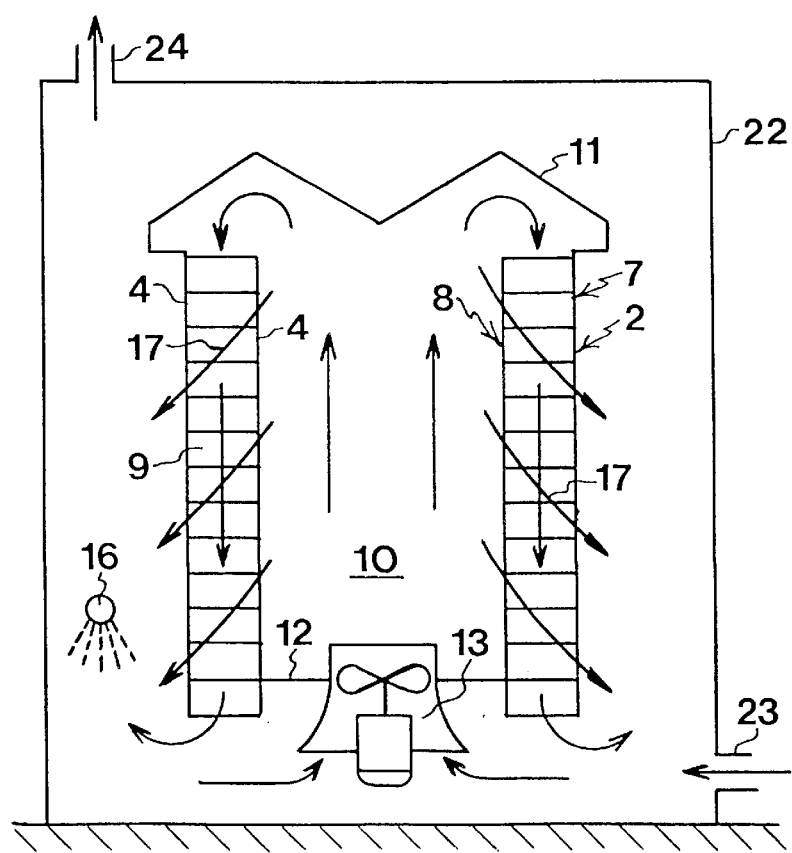

Finally, FIG. 5 illustrates a fuither embodiment of the apparatus according to the present invention which is identical with the embodiment illustrated in FIG. 2 except that the conditioning means is positioned outside a room 22 which accommodates the rest of the apparatus. The room 22 has a bottom inlet 23 connected to the conditioning means (not shown) and a top outlet 24 for expelling surplus air.

It goes without saying that the invention is not restricted to the embodiments described above, and that a variety of modifications is possible within the scope of the invention as defined in the appended claims. Thus, the means forming the inner cylinder wall may be separate from, the conveyor belt, e.g. comprise a central drum.

What is claimed is:

1. An apparatus for air-treatment of products, comprising
   an endless conveyor belt following through part of its length a helical path forming a stack of tiers;
   side plates at one longitudinal edge of the conveyor belt forming an outer cylinder wall delimiting the stack radially outwards;
   means forming an inner cylinder wall delimiting the stack radially inwards, whereby a central space is defined by the inner cylinder wall and an annular space is defined between the outer cylinder wall and the inner cylinder wall;
   an end closure substantially adjoining the outer cylinder wall at one end of the stack;
   means for blowing air through the central space towards the end closure and back through the annular space between the outer and inner cylinder walls for air-treatment of products carried by the conveyor belt in the helical path; and
   means for conditioning the air blown through the annular space between the outer and inner cylinder walls.

2. An apparatus as claimed in claim 1, wherein the end of the central space opposite the end closure is closed except for an inlet to the air-blowing means.

3. An apparatus as claimed in claim 2, wherein the annular space between the outer and inner cylinder walls is open at the end opposite the end closure.

4. An apparatus as claimed in claim 2, wherein the conditioning means is positioned in the central space within the inner cylinder wall.

5. An apparatus as claimed in claim 2, wherein the conditioning means is positioned outside a room having an inlet from the conditioning means and an outlet.

6. An apparatus as claimed in claim 1, further comnprising a further end closure substantially adjoining the outer cylinder wall at the other end of the stack, whereby air is blown in a substantially closed path.

7. An apparatus as claimed in claim 6, wherein the conditioning means is positioned in the inner space within the inner cylinder wall.

8. An apparatus as claimed in claim 6, wherein the conditioning means is positioned in the further end closure.

9. An apparatus as claimed in claim 8, wherein the further end closure comprises a chamber having a first opening towards the annular space between the outer and inner cylinder walls and a second opening towards the central space within the inner cylinder wall.

10. An apparatus as claimed in claim 1, wherein the side plates of an underlying tier of the stack support the outer longitudinal edge of an overlying tier of the stack.

11. An apparatus as claimed in claim 1, wherein the conveyor belt has side plates at both of its longitudinal edges forming said outer and inner cylinder walls.

12. An apparatus as claimed in claim 11, wherein the side plates of an underlying tier of the stack support the corresponding longitudinal edge of an overlying tier of the stack.

13. An apparatus as claimed in claim 3, wherein the conditioning means is positioned in the central space within the inner cylinder wall.

14. An apparatus as claimed in claim 3, wherein the conditioning means is positioned outside a room having an inlet from the conditioning means and an outlet.

* * * * *